United States Patent [19]

Quadir et al.

[11] Patent Number: 5,120,685
[45] Date of Patent: Jun. 9, 1992

[54] SINTERED SILICON NITRIDE

[75] Inventors: Tariq Quadir, Columbia, Md.; Roy W. Rice, Alexandria, Va.

[73] Assignee: W. R. Grace & Co.-Conn., New York, N.Y.

[21] Appl. No.: 629,754

[22] Filed: Dec. 18, 1990

[51] Int. Cl.$^5$ ............................................. C04B 35/58
[52] U.S. Cl. .......................................... 501/97; 501/98
[58] Field of Search ..................................... 501/97, 98

[56] References Cited

U.S. PATENT DOCUMENTS

| | | | |
|---|---|---|---|
| 4,511,525 | 4/1985 | Tsuge et al. | 501/97 |
| 4,609,633 | 9/1986 | Fukuhara et al. | 501/97 |
| 4,692,419 | 9/1987 | Matsui et al. | 501/97 |
| 4,708,943 | 11/1987 | Hsieh et al. | 501/97 |
| 4,764,490 | 8/1988 | Yamakawa et al. | 501/97 |
| 4,806,510 | 2/1989 | Kanai et al. | 501/97 |

*Primary Examiner*—Mark L. Bell
*Assistant Examiner*—Deborah Jones
*Attorney, Agent, or Firm*—Steven Capella

[57] ABSTRACT

Low cost sintered silicon nitride suitable for use as a structural ceramic is provided. Certain low grade silicon nitride powders can be used to produce low cost sintered silicon nitride bodies having good mechanical properties. Compositions using such silicon nitride powders in combination with various sintering aids are also disclosed.

19 Claims, No Drawings

SINTERED SILICON NITRIDE

FIELD OF THE INVENTION

The invention primarily deals with low cost silicon nitride ceramics generally useful for structural ceramic applications.

BACKGROUND OF THE INVENTION

Structural ceramics applications typically involve the supporting of mechanical stresses (e.g., from structural loads), the endurance of thermal stresses, and/or resistance to wearing conditions. In this area, sintered silicon nitride ceramics are very promising because of their potentially excellent mechanical properties.

Unfortunately, most known sintered silicon nitride structural ceramics are made from very expensive high grade silicon nitride powders (typically $25-60/lb.). Consequently, the high cost of the sintered product is a major limiting factor on the use of silicon nitride ceramics.

High grade powders typically contain very low total amounts of impurities (i.e., typically less than 2.0 wt. %). Impurities such as Fe, oxygen, or free silicon are each typically present at less than 0.1 wt. %. Indeed, methods of forming sintered silicon nitride ceramics for structural applications often specify that impurities be kept to a minimum to avoid degradation of mechanical properties.

High grade $Si_3N_4$ powders also usually contain a high proportion (at least 85-95 wt. % of the total $Si_3N_4$) of alpha phase silicon nitride which is the preferred starting phase for forming sintered silicon nitride bodies. The high grade powders correspondingly contain less than 15% beta phase silicon nitride. The most desirable high grade powders may not contain any beta phase at all. Large amounts of beta phase are avoided because it is generally thought that high beta phase powders are very difficult to sinter to high density.

Another characteristic of high grade powders is their fine particle size, typically in the submicron range. Fine particle size also generally facilitates obtaining a good sintered structural ceramic product.

Most silicon nitride structural ceramics are sintered at relatively high temperatures (i.e., at least about 1800° C.). The requirement of high sintering temperatures is another factor which increases the cost and decreases the applicability of known silicon nitride structural ceramics.

Requirement of high grade starting powders and high sintering temperatures has made structural silicon nitride ceramics quite expensive. Correspondingly, the use of silicon nitride structural ceramics has been limited by cost of the product. Consequently, there is a great need for less expensive silicon nitride ceramics which still provide good mechanical properties for many structural applications.

Refractory grade and other low grade silicon nitride powders are much less expensive than the high grade silicon nitride powders used to make structural ceramics. These silicon nitride powders are principally used for high temperature non-structural applications, such as for furnace linings. However, refractory grade and other low grade silicon nitride powders are generally thought to be unsuitable for producing sintered silicon nitride structural ceramics.

Refractory grade and other low grade silicon nitride powders usually contain relatively high amounts of impurities such as iron, oxygen and free silicon. These impurities often form relatively low temperature liquid phases that can be detrimental to the high temperature strength of a sintered product.

Refractory grade and other low grade silicon nitride powders also often contain high proportions of beta phase silicon nitride. Beta silicon nitride in the starting powder is generally thought to be very detrimental to obtaining a sintered product of desirably high density.

Refractory grade and other low grade silicon nitride powders also have a coarser particle size which is also less conducive to obtaining a sintered product of high density. Since these powders are used in furnace linings and the like, there is no need to incur the additional cost associated with particle size reduction or the synthesis techniques that produce lower initial particle sizes.

These characteristics of refractory grade and other low grade silicon nitride powders have discouraged use of such powders as starting materials for producing sintered silicon nitride structural ceramics. Thus, there remains a need for an inexpensive silicon nitride structural ceramic material.

SUMMARY OF THE INVENTION

The present invention overcomes the problems of the prior art by providing a low cost sintered silicon nitride suitable for use as a structural ceramic material.

The invention embraces the discovery that certain silicon nitride powders can be used to produce low cost sintered silicon nitride bodies having surprisingly good mechanical properties. These properties include wear resistance and thermal shock resistance comparable to those of much more expensive sintered materials.

The invention encompasses an unsintered ceramic composition comprising:
a) about 80-95 wt. % silicon nitride powder, the powder containing at least about 5 wt. % total impurities and at least about 25 wt. % beta silicon nitride; and
b) about 5-20 wt. % sintering aids.

In one embodiment, the $Si_3N_4$ powder used in the invention may contain about 0.5-1.0 wt. % iron, about 90-93 wt. % silicon nitride, about 2-4 wt. % free silicon and about 2.5-4.0 wt. % oxygen. In another aspect, silicon nitride powder may contain at least about 40 wt. % beta phase silicon nitride based on its total silicon nitride content.

In a further aspect, the invention includes a sintered silicon nitride composition containing about 75-90 wt. % silicon nitride and about 0.4-0.9 wt. % Fe. In a more specific embodiment, the sintered composition may also contain at least one rare earth metal oxide.

The invention also includes sintered silicon nitride compositions having a flexural strength (MOR) of at least about 60 KSI, more preferably at least about 70 KSI. Additionally, the sintered compositions preferably have a hardness of at least about 1700 Kg/mm², typically about 1700-1800 Kg/mm². The sintered silicon nitride of the invention may also have a fracture toughness of at least about 4.0 MPa√m. In a further feature, the invention includes sintered silicon nitride having wear resistance about twice as great as for typical high grade silicon nitrides when measured using a mill test.

The invention also encompasses methods of making sintered silicon nitride comprising:
a) combining silicon nitride, the silicon nitride containing at least about 5 wt. % total impurities and at least about 25 wt. % beta phase silicon nitride, and sintering aid to form a mixture;

b) compacting the mixture into a shape; and c) pressureless sintering the shape at about 1650° C. to 1700° C.

DETAILED DESCRIPTION OF THE INVENTION

While particular aspects and embodiments of the invention are described below, it should be understood that the invention is not limited to any of those specific aspects or embodiments.

The sintered silicon nitride ceramics of the invention can be made by forming a starting powder mixture containing the silicon nitride to be sintered. The starting mixture preferably contains refractory grade or other low grade silicon nitride powder and one or more sintering aids. The mixture may be processed by conventional techniques to form a shape to be sintered. Densification may be performed by any known technique such as pressureless sintering or hot pressing to produce the sintered silicon nitride ceramic product.

The starting mixture preferably contains about 80-95 wt. % refractory grade or other low grade silicon nitride powder and about 5-20 wt. % of sintering aids. In one embodiment, the powder mixture may contain about 3-8 wt. % alumina and about 2-12 wt. % of other sintering aids.

The silicon nitride powder may contain at least about 5 wt. % total impurities and at least about 25 wt. % beta phase silicon nitride. Typically, the powder used in the invention may contain at least about 40-50 wt. % beta phase.

In one embodiment, the silicon nitride powder may contain about 90-93 wt. % silicon nitride with the balance (about 7-10 wt. %) of impurities made up mostly by aluminum, carbon, calcium, iron, oxygen and free silicon. A typical powder used may contain about 0.40-0.60 wt. % Al, about 1.28-1.50 wt. % C., about 0.09-0.15 and about 2.4-3.5 wt. % free silicon.

The particle size of the silicon nitride used can vary. Typically, the average particle size is about 2.0 microns.

The sintering aids may be any known sintering aid useful for sintering silicon nitride. While sintering aids containing yttria can be used (e.g., $MgO-Al_2O_3Y_2O_3$), less expensive sintering aid compositions are preferred as a means of further reducing the cost of the final product. Examples of less expensive sintering aids include talc, clay, CaO, $Al_2O_3$, MgO, and rare earth oxides such as $La_2O_3-CeO_2-Nd_2O_3-Pr_6O_{11}$ and $La_2O_3-CeO_2-Nd_2O_3)_3$. The optimum sintering aid or combination sintering aids may vary depending on the characteristics of the starting powder and/or the process used to densify the silicon nitride powder.

One possible source of rare earth sintering aids such as listed above is a calcined rare earth carbonate material sold in uncalcined form by Davison Chemical Company as DIDY carbonate. When calcined, DIDY carbonate yields a weight ratio of $La_2O_3:CeO_2:Nd_2O_3:Pr_6O_{11}$ of about 4.2-4.6:1.2-2.0:3.1-3.5:1.0. This calcined material also typically contains trace amounts of $Sm_2O_3$, $Y_2O_3$, and $Gd_2O_3$.

The sintered silicon nitride products of the invention can have flexural strengths (MOR) of at least 60 KSI as measured in a four point bend test. Typically, the flexural strengths average at least about 70 KSI while strengths as high as 88 KSI have been achieved.

The sintered products of the invention also can have excellent hardness, fracture toughness, and wear resistance properties. Hardness values measured are 1700 $Kg/mm^2$ or greater (usually about 1700-1800 $Kg/mm^2$). Fracture toughness values are typically at least about 4.0 $MPa\sqrt{m}$. Wear rate in a sand slurry wear test is typically about 0.0023% wt. loss/hour or less. It should be understood that the invention is not limited to these particular end-product mechanical properties.

The invention is also not limited to a particular method of forming the sintered silicon nitride product. The examples below use pressureless sintering. The compositions of the invention can be sintered at relatively low sintering temperatures, usually about 1650°-1700° C.

The invention will now be illustrated with the following examples. The examples should not be construed as limiting the invention.

EXAMPLES

Several silicon nitride samples were prepared by combining silicon nitride (sold by Elkem Corporation a "Refractory Grade") having a composition shown in Table 1 with sintering aids (alumina+other sintering aid) and dry processing aids to form the various powder mixtures listed in Table 2.

The dry processing aids used are Thixcin R ™, a milling aid sold by N. L. Industries, and Carbowax 20M, a binder having a molecular weight of about 20,000 sold by Union Carbide.

TABLE 1

| Typical Refractory Silicon Nitride Composition | |
|---|---|
| Constituent | Wt. % |
| Al | 0.40–0.60 |
| C | 1.28–1.50 |
| Ca | 0.09–0.15 |
| Fe | 0.85–0.95 |
| O | 2.7–3.5 |
| Free Si | 2.4–3.5 |
| $Si_3N_4$ | balance |

TABLE 2

| | Unsintered Compositions | | | |
|---|---|---|---|---|
| Example* | $Al_2O_3$ sinter aid (Wt. %) | Other Sinter Aid | Other Sinter Aid (Wt. %) | $Si_3N_4$ (Wt. %) |
| 1 | 5 | DIDY Carbonate | 10 | 85 |
| 2 | 5 | $MgO-Al_2O_3-Y_2O_3$ | 10 | 85 |
| 3 | 5 | Talc | 10 | 85 |
| 4 | 5 | Clay | 10 | 85 |
| 5 | 5 | $La_2O_3-CeO_2-Nd_2O_3-Pr_6O_{11}$ | 10 | 85 |
| 6 | 5 | $La_2O_3-CeO_2-Nd_2O_3$ | 10 | 85 |
| 7 | 0 | Talc + CaO | 15 | 85 |

*All examples additionally contained about 1.25 wt. % ThixCin "R" and about 1.0 wt. % Carbowax 20M as dry processing aids based on the total ceramic powder content.

The powder mixtures were milled for about 16 hours in a one gallon mill jar. The milled mixtures were then sieved through a 200 mesh screen and molded into shapes. The shapes were pressureless sintered on a bed of silicon nitride and boron nitride powders in 1 atm $N_2$ at about 1650° C.

The samples were then tested for density, flexural strength (MOR), and hardness.

The flexural strength was measured using a four point bend test. The sintered specimen bars were ground on a 320 grit wheel. The specimen bars were tested under the following conditions:
Span:
  Inner = 20 mm
  Outer = 40 mm
Cross Head Speed: 0.02 in/min.
Width of Bar: 0.19 inch
Thickness of Bar: 0.11 inch
Machine: Instron
Environment: Room Temperature in air.

The hardness was measured by Vickers indentor.

The results for density, MOR, and hardness are shown in Table 3.

TABLE 3

| Example | Density (g/cc) | MOR (KSI) | Hardness (kg/mm$^2$) |
|---|---|---|---|
| 1 | 3.3 | 70 | 1700 |
| 2 | 3.2 | 70 | — |
| 3 | — | 20 | — |
| 4 | — | 25 | — |
| 5 | 3.22 | 70 | 1700 |
| 6 | 3.22 | 70 | 1700 |
| 7 | 3.15 | 70 | 1700 |

The material of Example 1 was tested for fracture toughness using an indentor with a 20 Kg load; the toughness value was about 4.0 Mpa$\sqrt{m}$.

Sand Slurry Wear Test

The wear resistance of the material of Example 1 was compared to other ceramic materials using the following test:

A Union Process 1-S Attritor mill having a 1.5 gallon tank was loaded with 4500 g of 36 grit SiC sand and 1500 g of water. The test samples were weighed and mounted on horizontal shafts which were rotated at 400 rpm through the SiC-water medium for 48-120 hours. At the end, the samples were removed, cleaned and weighed. The % weight loss per hour was determined by dividing the weight loss by the original weight and the exposure time in the test. The results are shown in Table 4 below.

TABLE 4

| Material | Test Time | % Wt. loss/hr. |
|---|---|---|
| Silicon Nitride of Example 1 | 48 | 0.0023 |
| High Grade Silicon Nitride | 48 | 0.0036 |
| Ultra High Grade Silicon Nitride | 120 | 0.0015 |
| Toughened Alumina (contains zirconia) | 120 | 0.0008 |
| High Grade Alumina | 48 | 0.0048 |
|  | 48 | 0.0136 |

Mill Wear Test

In this test, high grade silicon nitride milling media was compared to milling media made with the material of Example 1. 6000 grams of the media were placed with water in a ball mill container and then ground for 72 hours. The media was then removed and weighed. The high grade silicon nitride showed a weight loss rate of about 0.0067% per hour whereas the silicon nitride of the invention showed a weight loss rate of 0.0036% per hour.

What is claimed is:

1. An unsintered ceramic composition consisting essentially of:
   a) about 80-95 wt. % silicon nitride powder, said powder containing about 5-10 wt. % total of impurities selected from the group consisting of Al, C, Fe, Ca, O and free Si and at least about 25 wt. % beta silicon nitride; and about 5-20 wt. % sintering aid.

2. The unsintered composition of claim 1 wherein said silicon nitride powder contains about 0.5-1.0 wt. % iron.

3. The unsintered composition of claim 2 wherein said silicon nitride powder contains about 7-10 wt. % total of said impurities.

4. The unsintered composition of claim 3 wherein said silicon nitride powder contains about 2-4 wt. % free silicon.

5. The unsintered composition of claim 1 wherein said sintering aid includes a composition selected from the group consisting of La$_2$O$_3$—CeO$_2$—Nd$_2$O$_3$—Pr$_6$O$_{11}$, CeO$_2$—La$_2$O$_3$—Nd$_2$O$_3$, and MgO—Al$_2$O$_3$—Y$_2$O$_3$.

6. The unsintered composition of claim 1 wherein said silicon nitride powder contains at least about 40 wt. % beta phase silicon nitride.

7. A sintered silicon nitride composition made by a process comprising:
   a) combining silicon nitride powder, said powder containing about 5-10 wt. % total of impurities selected from the group consisting of Al, C, Fe, Ca, O and free Si and at least about 25 wt. % beta silicon nitride, and sintering aid to form a mixture;
   b) compacting said mixture into a shape; and
   c) sintering said shape.

8. The sintered composition of claim 7 having a modulus of rupture of at least about 60 KSI.

9. The sintered composition of claim 8 having a modulus of rupture of at least about 70 KSI.

10. The sintered composition of claim 8 having a hardness of at least about 1700 Kg/mm$^2$.

11. The sintered composition of claim 10 having a hardness of about 1700-1800 Kg/mm$^2$.

12. The sintered composition of claim 10 having a fracture toughness of at least about 4.0 MPa$\sqrt{m}$.

13. The composition of claim 7 wherein said silicon nitride powder contains about 0.5-1.0 wt. % iron.

14. The composition of claim 13 wherein said silicon nitride powder contains about 40-50 wt. % $\beta$-silicon nitride based on total silicon nitride content of said silicon nitride powder.

15. The composition of claim 7 wherein said sintering step c) is performed by pressureless sintering said shape.

16. The composition of claim 15 wherein said pressureless sintering is done at about 1650° C. to 1700° C.

17. The composition of claim 7 wherein said sintering aid contains alumina.

18. The composition of claim 7 wherein said sintering aid contains a composition selected from the group consisting of La$_2$O$_3$—CeO$_2$—Nd$_2$O$_3$—Pr$_6$O$_{11}$, CeO$_2$—La$_2$O$_3$—Nd$_2$O$_3$, and MgO—Al$_2$O$_3$—Y$_2$O$_3$.

19. The composition of claim 7 wherein said mixture consists essentially of about 80-95 wt. % of said silicon nitride powder and about 5-20 wt. % of said sintering aid.

* * * * *